United States Patent [19]

Beilin Solomon I. et al.

[11] Patent Number: 4,680,103

[45] Date of Patent: Jul. 14, 1987

[54] POSITIVE PARTICLES IN ELECTROPHORETIC DISPLAY DEVICE COMPOSITION

[75] Inventors: Beilin Solomon I., Oakland; Long K. Truong, San Jose, both of Calif.

[73] Assignee: EPID. Inc., Florham Park, N.J.

[21] Appl. No.: 822,297

[22] Filed: Jan. 24, 1986

[51] Int. Cl.⁴ .................... C25D 1/12; G03G 13/00; C23B 13/00; B01K 5/02
[52] U.S. Cl. .................. 204/299 R; 204/299 EC; 340/789; 350/362; 428/403; 428/405; 428/407
[58] Field of Search ............ 428/405, 403, 407, 411.1, 428/500; 350/362; 340/789; 204/299 EC, 299 R, 200 PG

[56] References Cited

U.S. PATENT DOCUMENTS

| | | | |
|---|---|---|---|
| 3,668,106 | 6/1972 | Ota | 204/299 |
| 3,892,563 | 7/1975 | Ota | 96/1.3 |
| 3,935,340 | 1/1976 | Yamaguchi | 428/407 |
| 4,041,481 | 8/1977 | Sato | 340/324 M |
| 4,077,936 | 3/1978 | Tanaka et al. | 260/33.8 R |
| 4,093,534 | 6/1978 | Carter et al. | 350/355 |
| 4,137,367 | 1/1979 | Sample et al. | 428/405 |
| 4,203,106 | 5/1980 | Dalisa et al. | 340/787 |
| 4,233,366 | 11/1980 | Sample et al. | 428/405 |
| 4,272,596 | 6/1981 | Harbour et al. | 430/37 |
| 4,285,801 | 8/1981 | Chiang | 204/299 R |
| 4,454,234 | 6/1984 | Czerlinski | 252/62.54 |
| 4,495,245 | 1/1985 | Zunker | 428/403 |
| 4,554,088 | 11/1985 | Whitehead et al. | 428/405 |

OTHER PUBLICATIONS

Ota et al, "Electrophoretic Image Display (EPID) Panel", *Proceedings of the IEEE* 61 (7), Jul. 1973.
Dalisa, "Electrophoretic Display Technology", *IEEE Transactions on Electron Devices*, vol. ED-24(7), Jul. 1977.

Primary Examiner—Arthur P. Demers

[57] ABSTRACT

An improved electrophoretic display device is provided including a first electrode, an opposed grid structure, and dielectric fluid having a plurality of inorganic pigment particles coated with an organosilane derivative movable between positions adjacent the electrodes during operation. The organosilane derivative preferably includes a quaternary ammonium moiety. The positively charged, pigment particles are rapidly released from the first, or viewing, electrode and are resistant to agglomeration.

20 Claims, 2 Drawing Figures

POSITIVE PARTICLES IN ELECTROPHORETIC DISPLAY DEVICE COMPOSITION

FIELD OF THE INVENTION

The present invention relates generally to electrophoretic display devices, and more particularly relates to compositions useful in electrophoretic display devices having pigment particles with positively charged ionic functional groups.

BACKGROUND OF THE INVENTION

A cathode ray tube is now widely used as an electric display apparatus because of its high speed and ease of scanning. Cathode ray tubes, however, are bulky and may not be practical for portable devices such as portable computers. Furthermore, high voltages are required for operating cathode ray tubes which render such tubes inconvenient for portable devices. It is also difficult to produce a cathode ray rube having a flat display panel. Thus, efforts have been made to develop display devices based upon concepts other than the cathode ray tube.

Transportation of charged particles by means of an applied electric field is commonly known as electrophoresis. Non-emissive display devices based upon electrophoretic principles offer the potential of considerably increased viewability (brightness, contrast and viewing angle) over emissive display devices such as electroluminescent devices.

Electrophoretic image display (EPD) devices have been proposed as alternatives to the cathode ray tube. An EPD device typically comprises a suspension of pigment particles in a dielectric liquid held between two electrodes, at least one of which is transparent. The pigment particles are charged either positively or negatively. The potential difference applied across the electrodes causes the particles to move towards one or the other electrode. If the pigment particles and the dielectric liquid are of two contrasting colors, the movement of the pigment particles will cause images to be displayed which are visible through the transparent electrode or electrodes. EPD-type displays are disclosed in U.S. Pat. Nos. 3,668,106; 3,892,563; 4,041,481; 4,093,534 and 4,203,106. These patents are hereby incorporated by reference to provide the basic information and background on the chemistry and technology of EPD-type displays.

Although the concept of a flat-panel, non-emissive electrophoretic display device is particularly promising for many applications, there have been problems in realizing commercially successful display devices based upon electrophoretic principles. Among the problems have been difficulties in adequate response time, contrast and stability.

SUMMARY OF THE INVENTION

It is an object of the present invention to provide electrophoretic display devices having fast moving particles with fixed and controllable charges.

It is another object of the present invention to provide particles having rapid release times from the viewing electrode, thus providing a significantly faster overall response time.

It is still another object of the invention to provide more flexibility in the choice of anode materials for electrophoretic display devices.

Additional objects, advantages and novel features of the invention will be set forth in part in the description which follows, and in part will become apparent to those skilled in the art on examination of the following, or may be learned by practice of the invention. The objects and advantages of the invention may be realized and attained by means of the instrumentalities and combinations particularly pointed out in the appended claims.

In one aspect of the invention, an electrophoretic display device includes a first electrode, an opposed grid structure, and dielectric fluid having a plurality of particles movable between positions adjacent the electrodes during operation. The particles are preferably discrete, inorganic pigment particles which are coated with an organosilane material. The coating is attached to the pigment core and includes a positively charged, quarternary ammonium moiety. The particles are preferably movable away from a position adjacent the first electrode (that is, are released from the viewing electrode) in less time than they are movable toward a position adjacent the first electrode (that is, packed onto the viewing electrode).

Compositions of the invention provide fast moving particles with rapid release times from the viewing electrode which are resistant to agglomeration and permit more flexibility in choice of anode materials. Correspondingly, EPD devices having the new suspension compositions display significantly faster overall response times (and significantly higher addressing speeds).

DETAILED DESCRIPTION OF THE INVENTION

Figure 1:
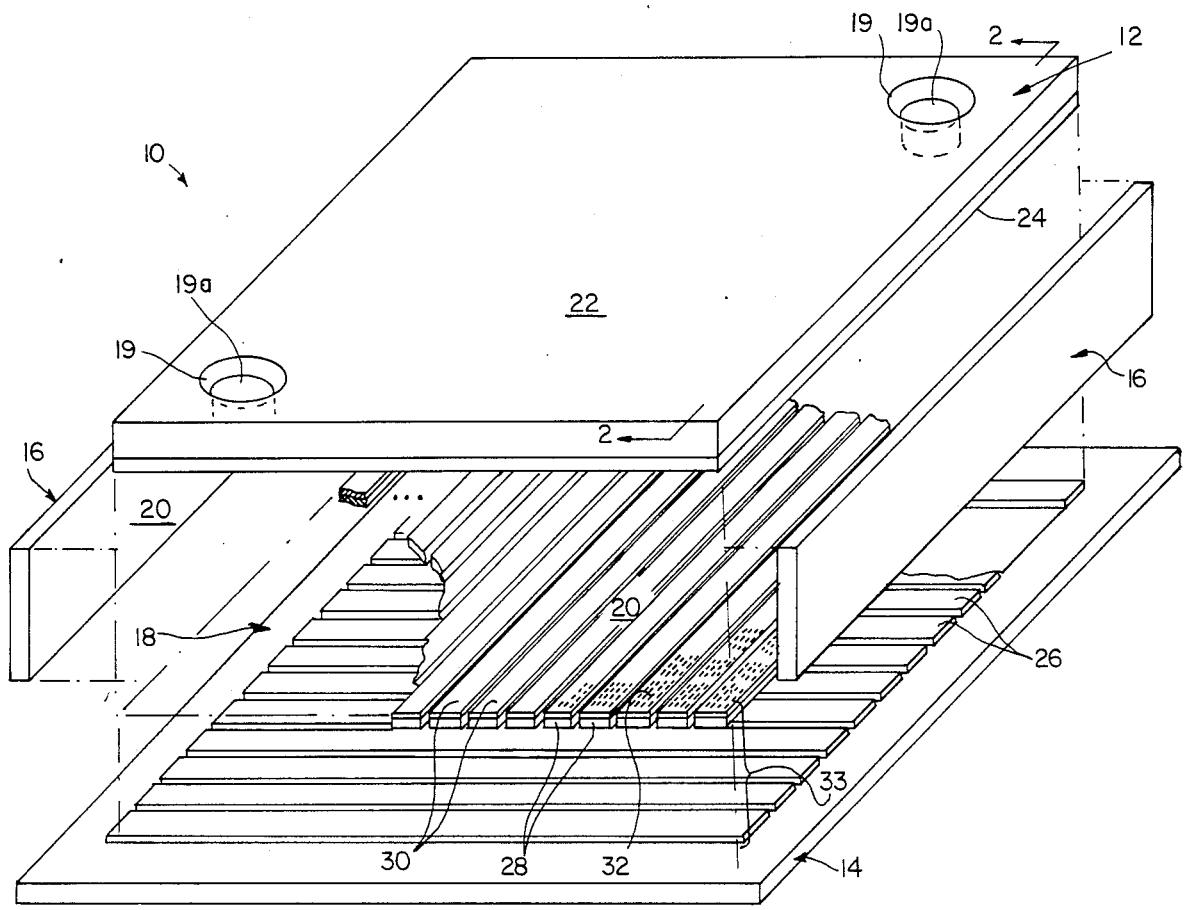
FIG. 1 is a simplified perspective view of an electrophoretic display device with portions partially cut away.

FIG. 1 is a simplified perspective view of an electrophoretic display device. As shown in FIG. 1, a cell 10 includes a front panel 12, as back panel 14, and side panels 16 to define an enclosed space 18. Fill holes 19 permit fluid to be filled into or emptied out of enclosed space 18, and plugs 19a provide a means for sealing enclosed space 18 from the ambient atmosphere. The enclosed space 18 is bounded by interior surfaces 20, with the cell exterior having exterior surfaces 22.

A layer of conductive material is deposited on one side of front panel 12 to serve as the anode 24. Substantially parallel strips 26 of a conductive material are deposited on one side of back panel 14 to serve as a set of cathodes. Each strip cathode is electrically isolated from adjacent strip cathodes. On top of cathodes 26 is deposited a layer of electrically insulating material 28. On top of layer 28 are deposited substantially parallel strips 30 of conductive material to serve as the control electrodes. Adjacent control electrodes 30 are also electrically isolated from each other.

The portions of insulator 28 exposed in between the control electrodes are etched away in a conventional manner to expose small sections of the cathodes between the columns of control electrodes. When cell 10 is viewed from the front through front panel 12, the control electrodes 30 overlap cathodes 26 in square or rectangular sections. Within each such section a number of rectangular wells 32 are etched into the control electrodes and into the insulator layer underneath to expose portions of the cathode at the bottom of the wells. Cathodes 26, insulating material 28 and control electrodes 30 together form grid structure 33.

Front panel 12 is typically composed of glass or transparent plastic. Anode 24 is composed of an electrically conductive metal or metal oxide, such as a mixture of indium oxide and tin oxide ("ITO"), and may be applied to front panel 12 by means such as vacuum sputtering. Anode 24 is sometimes hereinafter referred to as the first, or viewing, electrode.

Back panel 14 and side panel 16 are typically composed of glass or transparent plastic. Cathode 26 is an electrically conductive metal or metal oxide, such as ITO. The control electrodes 30 may be composed of ITO, aluminum, or other electrically conductive materials, and may be applied to the insulating material 28 by means of vacuum evaporation. Back panel 14 may extend beyond front panel 12 and side panels 16 (shown as flange 14a) and carry means thereon (not shown) for conducting voltages to the anode 24, control electrodes 30 and cathodes 26, which voltage conducting means may be applied to back panel 14 as by vapor deposition, vacuum sputtering or the like.

Figure 2:
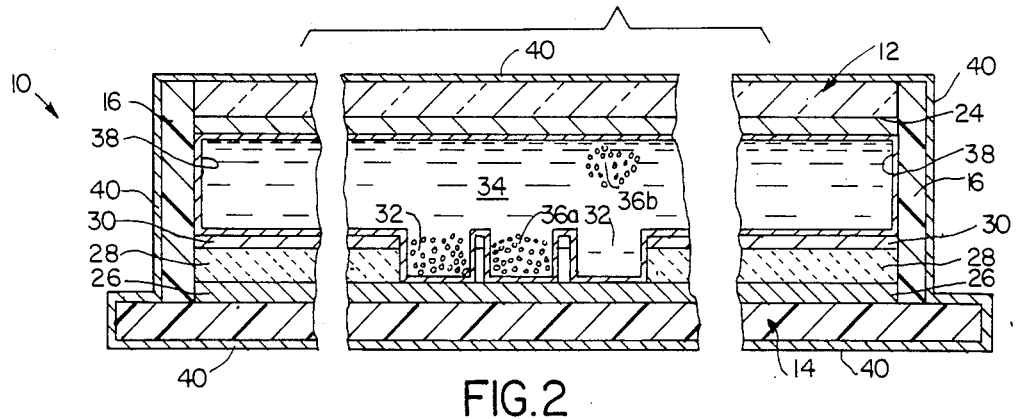
FIG. 2 is a highly enlarged, cross-sectional view of an electrophoretic display device taken along the II—II plane of FIG. 1.

Turning to FIG. 2, a dielectric, or suspending, liquid 34 is disposed within the enclosed space 18 and typically fills the volume between the front and back panels and side panels of the cell and wells 32. A preferred primary component, typically accounting for about 90 wt.% of the suspending liquid, is an organic solvent such as xylene.

The suspending liquid also includes one or more solubilized dyes to provide the dark, or colored background, image. Azo and anthraquinone dyes are known and useful. The suspensions can also include one or more additional components as charging agents, stabilizers and the like.

Particles 36 function as a diffuse reflector when the particles are packed on the viewing electrode (i.e. anode 24), and have a white (or bright) color. Suitable materials for particles 36 are inorganic pigments, such as titanium dioxide, alumina, silica or mixtures thereof, usually about 0.1 micron to about 10 microns in size. A particularly preferred pigment material for practice of the present invention is titanium dioxide.

Titanium dioxide is a white pigment with high light scattering efficiency and is commercially available from a variety of sources. It exists in two crystalline forms which have different densities and refractive indices. Either crystalline form is suitable for the present invention. Most commercially available titanium dioxide particles include trace amounts of other components, such as silicon, sodium, and aluminum. Table I, below, illustrates the surface area and elemental analyses of several commercially available $TiO_2$ particles suitable for use in conjunction with the present invention.

TABLE I

| Manufacturer | Surface Area ($m_2$/g) | % Ti | % Si | % Na | % Al | % Fe |
| --- | --- | --- | --- | --- | --- | --- |
| DuPont | | | | | | |
| R-100 | 6.42 | 58.5 | 0.033 | 0.014 | 0.71 | N/A |
| R-900 | 15.60 | 56.3 | 0.10 | 0.012 | 1.9 | 0.017 |
| Kerr McGee | 12.35 | 57.2 | 0.061 | 0.009 | 1.7 | 0.024 |

TABLE I-continued

| Manufacturer | Surface Area ($m_2$/g) | % Ti | % Si | % Na | % Al | % Fe |
| --- | --- | --- | --- | --- | --- | --- |
| Cr-800 | | | | | | |

The brightness of titanium dioxide particles is a complex function of the average primary particle size and the particle size distribution. Preferred pigment particles for use with the invention have a size of about 0.1 microns to about 1.0 microns, more preferably from about 0.2 microns to about 0.4 microns, with surface areas between about 5 to about 40 $m^2$/g, more preferably between about 12 to about 15 $m^2$/g.

As depicted in FIG. 2, particles 36a would be seen by an observer viewing the front panel as a white, or bright, dot against a colored background. However, particles 36b would not be seen, due to the colored fluid interposed between the observer and the particles 36b.

Particles 36a and 36b are moved in response to an applied electric field during operation of the cell, and the position of one particle group may be changed independently of the other. That is, one can address each group of particles (for example, particles 36a) while holding another group of particles (for example particles 36b) in a neighboring well. When voltages of the appropriate wave forms are applied to the anode, control electrodes and cathodes via voltage conducting means, the cell 10 can be used to display desirable images by movement of particles 36 between positions at the bottom of wells 32 (adjacent the cathodes), at the top of the wells (adjacent the control electrodes) and a position wherein the particles are packed against anode 24.

It has been discovered that chemically attaching a coating can modify the pigment surface as to lower its photoactivity and to reduce chemical and electrochemical degradation. Thus, the coating of pigment particles with organosilane is described in copending U.S. patent application Ser. No. 700,726, entitled "Compositions and Method for Electrophoretic Display Devices" (inventor Beilin et al., filed Feb. 12, 1985 and commonly assigned herewith), the disclosure of which is hereby incorporated by reference. The inorganic pigment particles of that application are coated with a regulated amount of charge control precursor which is chemically attached to the particulate surface. Preferred charge control precursors are organosilanes which are derived from organosilanes having the structure illustrated by Formula 1, below.

Formula 1 wherein $R_1$ is relatively inert with respect to the $R_2$, $R_3$ and $R_4$ moieties. The $R_2$, $R_3$ and $R_4$ moieties may be the same or different, functioning to chemically attach the organosilane to the particulate surface, for example via the hydroxy groups of a titanium dioxide surface, and preferably are alkoxy, acetoxy, halogen, or hydrogen. The $R_1$ moiety can be alkyl, cycloalkyl (substituted or non-substituted), aryl, alkylaryl or alkenyl, and typically is a hydrocarbon chain which may be branched or unbranched, saturated or unsaturated, preferably an alkyl group having about 4 to about 18 carbon atoms.

FIG. 2 illustrates that a thin layer 38 may be coated on the grid structure 33, preferably on the entire interior surfaces 20 to which the dielectric fluid would otherwise be exposed, as described in U.S. patent application Ser. No. 726,471, entitled "Electrophoretic Display Device with Polymer Coating" (inventors Beilin et al., filed Apr. 24, 1985 and of common assignment herewith) which is hereby incorporated by reference in its entirety. Layer 38 isolates at least the grid structure 33 from the dielectric fluid, and is adapted to decrease the degradation of dielectric fluid during operation of cell 10. Layer 38 is extremely thin, preferably substantially monomolecular.

The present invention is directed to an improved suspension which yields EPD cells having fast moving particles with improved response time during removal of electrophoretic particles from the viewing electrode. The novel suspension includes a plurality of discrete particles, substantially each of which includes pigment and an organosilane attached to the pigment. The attached organosilane includes a positively charged ionic functional moiety which is covalently bonded within the structure of the attached organosilane. Because the positively charged moieties are chemically attached to the particles, the charge on the movable pigment particles is controllable and (as will be further described hereinafter) the particles can be made to have a narrow charge distribution which is shifted towards neutrality. Such a narrow charge distribution provides for easier transport of particles within the cells and thus facilitates optimization of operating voltages as well. In general, the electrooptical characteristics of EPD cells having a narrow charge distribution are substantially improved.

The attached organosilane of the particles is derived from an organosilane precursor having a positively charged ionic functional moiety covalently bonded therein. This positively charged ionic functional moiety is preferably a quaternary ammonium moiety including silicon and having the structure illustrated by Formula 2, below.

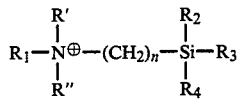

Formula 2 wherein $R_1$ is relatively inert with respect to the $R_2$, $R_3$ and $R_4$ moieties. The $R_1$ moiety can be alkyl, cycloalkyl (substituted or non-substituted), aryl, alkylaryl or alkenyl, and typically is a hydrocarbon chain which may be branched or unbranched, saturated or unsaturated, preferably an alkyl group having about 2 to about 22 carbon atoms. The $R_2$, $R_3$ and $R_4$ moieties may be the same or different, and function to chemically attach the organosilane precursor to the particulate surface, for example, via the hydroxy groups of a titanium dioxide surface, and preferably are alkoxy or acetoxy. R' and R'' may be the same or different and preferably are alkyl, aryl or alkylaryl and where alkyl preferably have about 1 to about 6 carbon atoms. The integer n is greater than or equal to 3 and less than about (or equal to) 18.

The organosilane precursor from which the attached organosilane of the particles is derived will be the structure illustrated by Formula 2, above, ionically associated with a negatively charged ion (such as halide) or groups such as hydroxy, carboxy, or sulfonate.

For example, octadecyl dimethyl [3-(trimethoxysilyl)]propyl ammonium chloride (sometimes hereinafter "SiNC$_{18}$") is a particularly preferred, commercially available organosilane precursor for attaching to pigment particles in accordance with the present invention. Other suitable organosilane precursors include 3-(n-styrylmethyl-2-aminoethylamino)propyltrimethoxysilane hydrochloride, tetradecyldimethyl (3-trimethoxysilylpropyl)ammonium bromide, n-trimethoxysilylpropyltri-n-butylammonium chloride, n-trimethoxysilylpropyl-n,n,n-trimethylammonium chloride, 2-methacryloxyethyldimethyl [trimethoxysilylpropyl]ammonium chloride, octadecyldimethyl [3-(trimethoxysilyl)-propyl]ammonium chloride, and n-trimethoxysilylpropyl-n,n-dimethylammonium acetate, respectively illustrated by the following formulae.

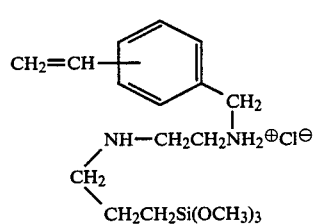

Formula 3

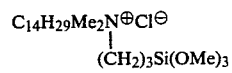

Formula 4

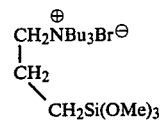

Formula 5

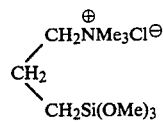

Formula 6

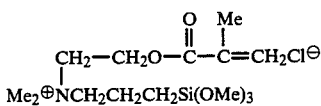

Formula 7

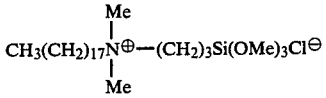

Formula 8

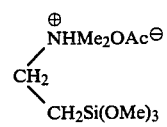

Formula 9

Attachment of such an organosilane precursor to the core surface of pigment particles is generally illustrated by Scheme I, below (where X is a negatively charged ion such as, for example, chloride):

Scheme I

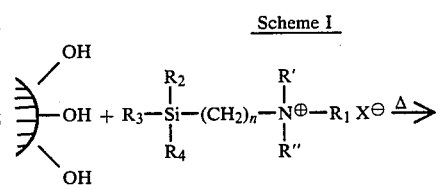

-continued
Scheme I

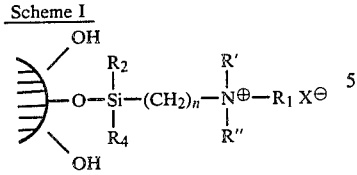

-continued
Scheme II

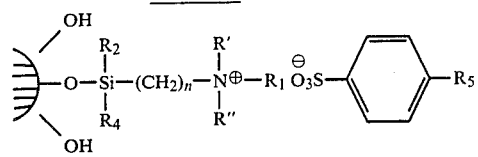

The Scheme I, above, only one hydroxyl group is shown reacting with only one of $R_2$, $R_3$ and $R_4$ (i.e. $R_3$); however, it should be understood that one or both of $R_2$ and $R_4$ may also react with adjacent hydroxyl groups.

Compositions in accordance with the present invention have counterions (that is, anions) which are ionically associated with the positively charged quaternary ammonium moiety attached to the pigment particles. Although these associated anions could be, for example, halide ions (such as is shown in Scheme I, above), it has been found that small, negatively charged counterions such as chloride tend to be electrochemically unstable under operating conditions of the electrophoretic display devices.

As a consequence, it is preferred to utilize larger anionic groups such as, for example, organic sulfonic acids or sulfonates in preparing and using compositions in accordance with the present invention. The preparation of a particularly preferred embodiment of the present invention is generally illustrated by Scheme II, below:

Scheme II

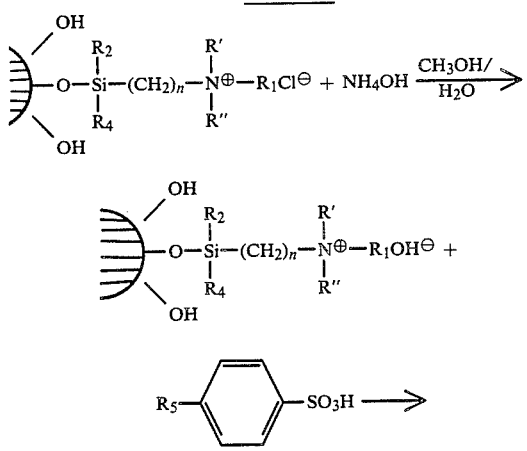

wherein $R_5$ is an alkyl moiety having from about 1 to 16 carbon atoms (e.g. $CH_3$ through $C_{12}H_{25}$) and may be either saturated or unsaturated, branched or unbranched. The alkyl moiety is, however, preferably a saturated hydrocarbon group.

Practice of the present invention provides a faster release time for the particles from the viewing electrode. That is, where the particles are white (such as titanium dioxide) and the suspending liquid is blue (such as provided by OBZV dyes), then the white-to-blue transition time for the particles can be on the order of about 2.3 ms, rather than about 4 ms for control particles.

The attached organosilane coating, which includes the positively charged, ionic functional moiety of the particles, is preferably in an amount of from about 0.25 wt. % to about 2.30 wt. % with respect to the total weight of the particles, more preferably from about 0.8 wt. % to about 1.8 wt. %.

The dielectric, or suspending, liquid preferably includes an "aprotic solvent," that is, a solvent which will neither yield nor accept protons, as described in U.S. patent application Ser. No. 812,932, entitled "COMPOSITION FOR ELECTROPHORETIC DISPLAY" (inventors Beilin et al.), filed Dec. 23, 1985 and of common assignment herewith) which is incorporated by reference. The specific solvation of ions by the aprotic solvent regulates the amount of charge on the pigment particles and in the solution, and in addition regulates the amount of current passed through the device.

Useful aprotic solvents are organic solvents which have: a high dielectric constant, preferably greater than about 20; a dipole moment of at least about 2 D; an electrochemical redox potential of below approximately −2.5 V; a high boiling point, preferably greater than about 80° C.; and a partial pressure preferably lower than about 100 mm at 27° C.

Particularly preferred aprotic solvents include alkyl and aromatic nitriles such as acetonitrile and benzonitrile, dialkylsulfoxides such as dimethylsulfoxide, alkyl phosphoric triamides such as hexamethyl phosphoric triamide, alkyl carbonates (e.g., methyl, ethyl, and propylene carbonate), dimethylformamide, nitroalkane, nitro-substituted aromatic compounds, and mixtures thereof. Properties of several suitable aprotic solvents are listed in Table II.

TABLE II

| | Physical Properties of Selected Organic Solvents | | | | | | | |
|---|---|---|---|---|---|---|---|---|
| Substance | Temp °C. | Density g/ml³ | Refractive Index $\eta D$ | Viscosity cp | Dielectric Constant $\epsilon$ | Dipole Moment D | F. W. g/mole | b. pt °C. | m. pt °C. |
| m-xylene | 20 | 0.864 | 1.497 | 0.617 | 2.37 | .37 | 106 | 138 | −48 |
| Acetonitrile | 20 | 0.782 | 1.344 | 0.375 | 37.5 | 3.92 | 41 | 82 | −48 |
| Benzonitrile | 20 | 1.005 | 1.5282 | 1.447 | 25.2 | 4.18 | 103 | 191 | −13 |
| N,N—Dimethyl Formamide | 25 | 0.945 | 1.427 | 0.802 | 36.7 | 3.86 | 73 | 153 | −61 |
| Dimethyl Sulfoxide | 25 | 1.096 | 1.477 | 1.976 | 40.6 | 3.7 | 78 | 189 | +18 |
| Hexamethyl Phosphoric | 20 | 1.027 | 1.459 | 0.347 | 30.0 | 4.31 | 179 | 231 | +7 |

TABLE II-continued
Physical Properties of Selected Organic Solvents

| Substance | Temp °C. | Density g/ml$^3$ | Refractive Index $\eta$D | Viscosity cp | Dielectric Constant $\epsilon$ | Dipole Moment D | F. W. g/mole | b. pt °C. | m. pt °C. |
|---|---|---|---|---|---|---|---|---|---|
| Triamide | | | | | | | | | |
| Nitrobenzene | 20 | 1.203 | 1.553 | 1.634 | 34.8 | 4.22 | 123 | 310 | +6 |
| Nitromethane | 25 | 1.131 | 1.380 | 0.595 | 35.87 | 3.46 | 61 | 101 | −29 |
| Methyl Carbonate | 20 | 1.069 | 1.368 | | | | 90 | 90 | +3 |
| Propylene Carbonate | 20 | 1.189 | 1.421 | | 68.0 | | 102 | 240 | −55 |
| Water | 20 | 0.998 | 1.733 | 1.001 | 80.10 | | 18 | 109 | 0 |

The solvent suspensions may, if desired, include water or other additives. In a preferred embodiment of the invention, the suspending liquid includes at least about 90 wt.% of an organic solvent such as xylene. The remaining about 10 wt.% or less of the suspending liquid is comprised primarily of either an aprotic solvent as outlined above or a water/aprotic solvent mixture. In a particularly preferred embodiment, the suspending liquid includes about 0.005-10 wt.% aprotic solvent, preferably about 0.05-1 wt.%, and optionally about 0.005-0.1 wt.%, preferably 0.01-0.06 wt.%, water (i.e., 0.01-0.06, preferably 0.03 wt.%).

Inclusion of these suspending liquid components depends to a large extent on the electrode materials selected. For electrode materials which are easily oxidized (e.g., aluminum), a water-free suspending liquid including an aprotic solvent should be used; for electrode materials which are by contrast electrochemically stable (e.g., palladium), an aprotic solvent/water mixture may be used instead. Practice of the present invention also permits use of anode materials which are resistant to oxidation, such as Nichrome alloy (available from Driver-Harris Co.), nickel and chromium.

Upon appropriate selection of a bulky $R_1$ group of the organosilane precursor illustrated by Formula 2, above, one can obtain particles having a more narrow charge distribution which is shifted towards neutrality. That is, stearic hindrance will prevent attachment of organosilane precursor molecules at hydroxyl groups adjacent to hydroxyl groups through which organosilane derivatives are attached on particles such as titanium dioxide.

It is to be understood that while the invention is described in conjunction with the preferred specific embodiments thereof, that the foregoing description as well as the following Examples are intended to illustrate and not limit the scope of the invention, which is defined by the scope of the appended claims. Other aspects, advantages and modifications within the scope of the invention will be apparent to those skilled in the art to which the invention pertains.

Experimental

Suppliers, suppliers' designations and generic names for several materials referred to in this disclosure are listed below.

| Suppliers | Supplier's Designation | Generic Name |
|---|---|---|
| E.I. du Pont Nemours & Co. | Ti-PURE, R-900 | Titania |
| Keystone Ingham Corp. | Calico Oil Blue ZV (OBZV) | 1,4-Bis[2-ethylhexyl-amino]anthraquinone |
| Minnesota Mining & Manufacturing | FC 432 | fluorinated acylic surfactant |

Electrical, optical and visual characteristics mentioned in this disclosure are defined below. Overall performance of the cells tested was based on a combination of these characteristics.

Electrical:
Peak Current ($I_p$)—a measurement of the maximum or peak current obtained in the first milliseconds after a device is turned on.
Background Current ($I_b$)—a measurement of the background or steady state current taken after a much longer time than the $I_p$ (hundred of milliseconds).
Total Charge (Q)—measurement of the total charge transferred through the cell during one switch.

Optical:
Brightness (Br)—measurement of the brightness (of the white state) with respect to a $BaSO_4$ standard.
Blueness (B)—same measurement, but taken with respect to the dark, or blue, state.
Contrast Ratio (CR)—Ratio of two brightnesses measured from the same viewing electrode at positive and negative state.
Response Time (T)—the time required for the electrophoretic particles during their deposition or removal to reach certain values of brightness measured from viewing electrode. ($T_{w-b}$)—pigment response time from white (w) to blue (b). $T_{w-b}$ (10%) and $T_{b-w}$ (10%) represent time to reach 10% of maximum brightness, $T_{w-b}$ (50%) and $T_{b-w}$ (50%) represent time to reach 50% of maximum brightness, etc.

Visual:
Sticking—particle deposition on viewing electrode during removal cycle.

The standard type of EPD cell (hereinafter "Grid cell") has a first electrode (anode) and includes a grid structure having a second electrode (cathode), control electrode, and a dielectric spacer therebetween. In these Grid cells, wells are etched into the control electrode and dielectric spacer so as to expose portions of the cathode. A simplified model of this cell—a "Test cell" or "T-cell" was used in the Examples which follow. This cell represents a simple model of an electrophoretic display device having two electrodes and no control electrode.

These T-cells were made by separating two metallic coated glass plates by a 50-micron thick epoxy-containing peripheral spacer. The metallic sides of the plates were placed face to face, and the colloidal suspension to be tested was placed within the cell. One of the electrodes was made from transparent metal oxide (indium tin oxide, or "ITO"), and the other electrode was made either from the same material or from one of various metals or metal alloys (e.g., aluminum, nickel, chromium, nickel chromium, palladium, molybdenum, tungsten).

Example I, below illustrates the preparation of particles substantially each of which includes pigment and an attached organosilane. The attached organosilane includes a positively charged ionic functional moiety covalently bonded therein.

EXAMPLE I 10 g. of R-900, $TiO_2$ particles were admixed with 1 g. of octadecyl-dimethyl [3-triumethoxysiyl)propyl ammonium chloride (available from Petrarch Systems, Inc., with a molecular weight of 496.3, $d_4$ (20° C.) of 0.89 and flashpoint 24° C., 50% in methanol) in 80 g. of m-xylene in a 250 ml boiling flask. The suspension was mixed using a bath sonicator followed by refluxing for 6 hrs. at about 138° C. while mixing with a magnetic stirrer. The mixture was cooled, washed with xylene, and the dried under vacuum. The covalent attachment of the attached organosilane was demonstrated by ionization coupled plasma (ICP) in which the amount of attached organosilane was determined to be about 1.6 wt. %.

EXAMPLE II

Three compositions in accordance with the present invention were prepared, each with a different amount of organosilane derivative being attached with respect to the total weight of the particles. Inventive composition (a) had 0.25 wt. % organosilane derivative attached, inventive composition (b) had 1.35 wt. % attached, and inventive composition (c) had 2.29 wt. % attached. Control composition (d) resulted in substantially no attached organosilane derivative. The three inventive compositions and the fourth, control composition were all prepared substantially in the same manner (beginning with 10 g. of $TiO_2$, 1 g. of $SiNC_{18}$ in 80 g. of m-xylene) but with temperature and times being varied, as illustrated by Table III, as follows.

TABLE III

| Composition | Condition | % $SiNC_{18}$ Grafted |
|---|---|---|
| Control (d) | Room temperature, 6 hrs. | 0 |
| Inventive (a) | Reflux, 1 hr. | 0.25 |
| Inventive (b) | Reflux, 6 hrs. | 1.35 |
| Inventive (c) | Reflux, 16 hrs. | 2.29 |

As may be seen from the data of Table III, when the coating reaction is conducted at sufficiently elevated temperature (preferably from about 100° C. to about the boiling point of the non-aqueous liquid solution here at about 138° C., i.e. the boiling point of m-xylene), the weight % coated becomes primarily a function of time.

The inventive particles prepared as described in Examples I and II had chloride as an associated anion. Examples III-V, below, illustrate a direct conversion of these particles to inventive particles having the more preferred, bulky associated anions by means of anion exchange.

EXAMPLE III 10 g. of particles prepared as described for Example I were admixed with 0.5 g. docecyl benzene sulfonic acid in 100 ml of m-xylene. The admixture was heated to about 50° C. for about 2 hrs. The particles were then washed with m-xylene and vacuum dried to yield inventive particles with associated ions illustrated by Formula 10, below.

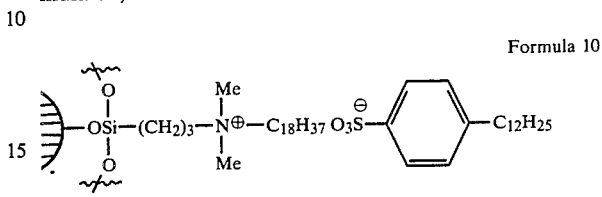

Formula 10

EXAMPLE IV 10 g. of particles prepared as described in Example I were admixed with 0.5 g. p-isopropyl benzene sulfonate (sodium salt) in 100 ml of 50% ethanol/water, heated to about 50° C. for 1 hr. and then washed with isopropyl alcohol and xylene. Following the drying, particles having associated anions with the structure illustrated by Formula 11, below, were obtained.

Formula 11

EXAMPLE V 10 g. of particles prepared as described by Example I were admixed with 0.5 g. AOT in 100 ml of ethanol/water (50—50), heated to 30° C. for 2 hrs., washed with ethanol and then with xylene, and vacuum dried at room temperature for 3 hrs. The resultant particles with associated anions had the structure illustrated by Formula 12, below.

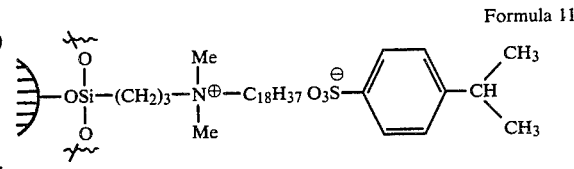

Formula 12

Preparation of inventive particles having bulky, associated anions is preferably by means of an indirect route, as illustrated by Example VI, below. The resultant particles from Example VI have the structure illustrated by Formula 12, above, and are a particularly preferred embodiment of the invention.

EXAMPLE VI

Step (a): Inventive particles prepared as described by Example I were washed 3 times with a molar excess of 2% ammonium hydroxide in ethanol/water (50—50) and then washed 3 times with ethanol/water (50—50) until the silver nitrate test indicated there was no chloride. The inventive particles (now having hydroxide as associated anions) were distilled in m-xylene to remove unreacted ionic species (such as unreacted ammonium hydroxide), then washed with m-xylene and vacuum dried. Meanwhile, a dodecyl benzene sulfonic acid solution (DBS) was prepared by weighing 1.66 g. of DBS (obtained from Alpha Chemical as a 98 wt. % solution) in 500 ml volumetric flask filled with 50:50 water/ethanol solution. (I.e., a 0.01 DBS solution). The solution was titrated with NaOH solution phenolphtalein as indicator.

Step (b): 10 g. of the particles prepared in step (a) were dispersed in 100 ml water:ethanol solution (50—50) to which was added to 20 ml of the DBS solution. The admixture was sonified for 3 min. and centrifuged for 0.5 hr., then washed 3 times with m-xylene and vacuum dried.

Three compositions in accordance with the invention were analyzed for chlorine as an impurity by ion chromatography, and compared with chlorine analysis of titanium dioxide particles (untreated) as control and with chlorine analysis of particles prepared as in Example I. Table IV, below, illustrates the data of these chlorine determinations.

TABLE IV

| Particles Sampled | Chlorine (ppm) |
|---|---|
| TiO$_2$ (control) | 24 |
| Inventive (Example I) | 589 |
| Inventive (Example IV) | 128 |
| Inventive (Example V) | 37 |
| Inventive (Example VI) | 24 |

As can be seen by the date of Table IV, above, the particularly preferred inventive particles prepared as described for Example VI had virtually all of the chloride ion replaced with the more bulky anion decybenzene sulfonic acid.

The particle size and distribution for these Example VI particles (which are a particularly preferred embodiment of the present invention) were determined, and the data compared against control particles (i.e. titanium dioxide without any attached organosilanes). Table V, below, illustrates the data of these determinations.

TABLE V

| Particles Sampled | Particle Diameter, μm | | |
|---|---|---|---|
| | Number Average, μm | Std. Dev. | Weight Average |
| Control | 0.42 | 0.22 | 0.85 |
| Inventive | 0.46 | 0.24 | 0.87 |

As shown by the data of Table V, above, the particularly preferred embodiment particles do not agglomerate as a result of the organosilane attachment.

An electrophoretic display device composition was prepared and tested in T-cells as follows. 40 mg/cc of the Example VI inventive particles were suspended in m-xylene, 7 mg/cc OBZV dye and 1.5 FC 432 as surfactant. Table VI, below, sets out electrical, optical and visual characteristics of the tested composition.

TABLE VI

| Br %/CR | I$_p$I$_b$ (μA) | Q (μc) | T$_{w-b}$(50%)/T$_{b-w}$(50%) msec |
|---|---|---|---|
| 17%/5.67 | 68/1.9 | 0.18 | 2/3.8 |

The electrophoretic composition in accordance with the invention provided good overall visual performance, and as may be seen from the data of Table VI, above, had very fast response time, particularly during release of the inventive particles from the viewing electrode (i.e. T$_{w-b}$). In other experiments, it was found that use of the inventive particles can obviate the necessity of charge control agents or surfactants in the display device suspensions.

We claim:

1. A composition useful in electrophoretic display devices comprising:
    a plurality of discrete particles, substantially each of the particles including pigment and an organosilane attached thereto, the attached organosilane including a positively charged ionic functional moiety covalently bonded therein.

2. The composition as in claim 1 wherein the attached organosilane of the particles is derived from an organosilane precursor moiety having the structure

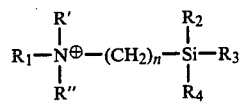

wherein R$_1$ is alkyl, cycloalkyl, aryl, alkylaryl or alkenyl, R' and R" are alkyl, n is 3 to about 18, R$_2$ is alkoxy or acetoxy, R$_3$ is alkoxy or acetoxy, and R$_4$ is alkoxy or acetoxy.

3. The composition as in claim 1 wherein the attached organosilane of the particles is derived from a quaternary ammonium salt.

4. The composition as in claim 1 wherein the attached organosilane of the particles is derived from octadecyl dimethyl [3-(trimethoxysilyl)]propyl ammonium chloride.

5. The composition as in claim 1 wherein substantially each of the particles includes an anion ionically associated with the positively charged ionic functional moiety.

6. The composition as in claim 5 wherein the associated anion includes a sulfonate group or is a sulfonic acid.

7. The composition as in claim 5 wherein the associated anion is an alkyl benzene sulfonate, an alkyl sulfonate or an alkyl benzene sulfonic acid.

8. The composition as in claim 5 wherein the associated anion is dodecylbenzene sulfonic acid or a para-isopropyl benzene sulfonate.

9. In an electrophoretic display device having interior and exterior surfaces, said interior surfaces defining an enclosed space and including a first electrode, an opposed grid structure, and dielectric fluid disposed within said enclosed space, said grid structure having a second electrode and a third control electrode with a dielectric spacer therebetween said dielectric fluid having a plurality of particles movable between positions adjacent said electrodes in response to an electric field applied to said electrodes during operation, the improvement comprising:
    sustantially each of the particles including pigment, the pigment forming a core of the particle and defining a core surface, and a quaternary ammonium moiety being attached to the core surface.

10. The electrophoretic display device as in claim 9 wherein the quaternary ammonium moiety is covalently attached to the core surface via an organosilane derivative.

11. The electrophoretic display device as in claim 10 wherein the organosilane derivative by which the quaternary ammonium moiety is covalently attached is derived from an organosilane precursor moiety having the structure

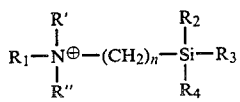

wherein $R_1$ is alkyl, aryl or alkylaryl and if alkyl or alkylaryl, then the alkyl has about 2 to about 22 carbon atoms, $R'$ and $R''$ are alkyl, aryl or alkylaryl and if alkyl or alkylaryl then the alkyl has about 1 to about 6 carbon atoms, n is 3 to about 18, $R_2$ is alkoxy or acetoxy, $R_3$ is alkoxy or acetoxy, and $R_4$ is alkoxy or acetoxy.

12. The electrophoretic display device as in claim 10 wherein the quaternary ammonium moiety is ionically associated with an alkyl benzene sulfonate or an alkyl benzene sulfonic acid.

13. The electrophoretic display device as in claim 10 wherein the pigment includes titanium dioxide, alumina, silica or mixtures thereof.

14. The electrophoretic display device as in claim 10 wherein the organosilane derivative is in an amount of from about 0.25 wt.% to about 2.30 wt.% with respect to the total weight of the particles.

15. The electrophoretic display device as in claim 9 wherein the particles are movable away from a position adjacent said first electrode in less time than the particles are movable toward a position adjacent said first electrode.

16. A method of synthesizing positively charged pigment particles useful in electrophoretic display devices, comprising the steps of:
providing a plurality of discrete inorganic pigment particles defining surfaces, substantially each surface having at least one hydroxyl group; and,
reacting said at least one hydroxyl group with at least one silyl quaternary ammonium salt at an elevated temperature in a nonaqueous solvent for a sufficient period of time to attach chemically a silyl quaternary ammonium moiety as a derivative of the at least on silyl quaternary ammonium salt to the surfaces of the particles.

17. The method of claim 16, wherein said silyl quaternary ammonium salt has the structure

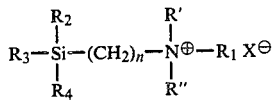

wherein $X^\ominus$ is a negatively charged ion or group and $R_1$ is alkyl, cycloalkyl, aryl, alkylaryl or alkenyl, $R'$ and $R''$ are alkyl, n is 3 to about 18, $R_2$ is alkoxy or acetoxy, $R_3$ is alkoxy or acetoxy, and $R_4$ is alkoxy or acetoxy.

18. The method as in claim 16 or 17 wherein the inorganic pigment particles are titanium dioxide, alumina, silica or mixtures thereof.

19. The method as in claim 18 wherein the reacting is conducted at a temperature of at least about 100° C.

20. The method as in claim 17 wherein $X^\ominus$ is a halide ion or a hydroxy, acetoxy, carboxy or sulfonate group.

* * * * *